(12) United States Patent
Sun et al.

(10) Patent No.: US 7,452,082 B2
(45) Date of Patent: Nov. 18, 2008

(54) EXCITATION LIGHT EMISSION APPARATUS

(75) Inventors: Xiao-Dong Sun, Fremont, CA (US); Jian-Qiang Liu, Campbell, CA (US)

(73) Assignee: Superimaging, Inc., Fremont, CA (US)

( * ) Notice: Subject to any disclaimer, the term of this patent is extended or adjusted under 35 U.S.C. 154(b) by 126 days.

(21) Appl. No.: 11/107,203

(22) Filed: Apr. 15, 2005

(65) Prior Publication Data

US 2005/0231692 A1    Oct. 20, 2005

Related U.S. Application Data

(60) Provisional application No. 60/563,376, filed on Apr. 19, 2004, provisional application No. 60/579,067, filed on Jun. 10, 2004, provisional application No. 60/586,746, filed on Jul. 10, 2004, provisional application No. 60/590,469, filed on Jul. 24, 2004, provisional application No. 60/598,527, filed on Aug. 3, 2004, provisional application No. 60/599,826, filed on Aug. 7, 2004, provisional application No. 60/626,152, filed on Nov. 8, 2004, provisional application No. 60/645,245, filed on Jan. 20, 2005, provisional application No. 60/658,242, filed on Mar. 3, 2005.

(51) Int. Cl.
*G03B 21/14* (2006.01)

(52) U.S. Cl. .............................. 353/31; 353/84; 359/453

(58) Field of Classification Search .................. 353/30, 353/37, 84, 98, 31, 34; 359/350, 359, 361, 359/452, 443, 460
See application file for complete search history.

(56) References Cited

U.S. PATENT DOCUMENTS

| | | | |
|---|---|---|---|
| 3,598,995 A | 8/1971 | Inoue et al. | |
| 3,881,800 A | 5/1975 | Friesem | |
| 3,953,117 A | 4/1976 | Cannon | |
| 4,158,210 A | 6/1979 | Watanabe et al. | |
| 4,689,522 A | 8/1987 | Robertson | |
| 4,713,577 A | 12/1987 | Gualtieri et al. | |
| 4,814,666 A | 3/1989 | Iwasaki et al. | |

(Continued)

FOREIGN PATENT DOCUMENTS

DE    10350529 A1    3/2005

(Continued)

OTHER PUBLICATIONS

Murray, "Head-up displays get second glance", EE Times, Jan. 5, 2004.

(Continued)

*Primary Examiner*—William C. Dowling
(74) *Attorney, Agent, or Firm*—Sherr & Vaughn, PLLC

(57) ABSTRACT

In accordance with embodiments, viewable images can be created in glass. Viewable images may be created in glass by using a projector which projects ultraviolet light to excite light emitting material. Clear images may be created in glass because the size the light emitting particles in the glass is less than 400 nanometers. In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching.

28 Claims, 9 Drawing Sheets

U.S. PATENT DOCUMENTS

| | | | |
|---|---|---|---|
| 4,960,314 A | 10/1990 | Smith et al. | |
| 4,989,956 A | 2/1991 | Wu et al. | |
| 5,045,706 A | 9/1991 | Tanaka et al. | |
| 5,078,462 A | 1/1992 | Gravisse | |
| 5,142,387 A | 8/1992 | Shikama et al. | |
| 5,162,160 A | 11/1992 | Matsui et al. | |
| 5,233,197 A | 8/1993 | Bowman et al. | |
| 5,289,315 A | 2/1994 | Makita et al. | |
| 5,347,644 A | 9/1994 | Sedlmayr | |
| 5,424,535 A | 6/1995 | Albion et al. | |
| 5,473,396 A | 12/1995 | Okajima et al. | |
| 5,566,025 A | 10/1996 | Knoll et al. | |
| 5,633,737 A * | 5/1997 | Tanaka et al. | 349/95 |
| 5,646,479 A | 7/1997 | Troxell | |
| 5,684,621 A | 11/1997 | Downing | |
| 5,764,403 A | 6/1998 | Downing | |
| 5,784,162 A | 7/1998 | Cabib et al. | |
| 5,786,582 A | 7/1998 | Roustaei et al. | |
| 5,914,807 A | 6/1999 | Downing | |
| 5,921,650 A | 7/1999 | Doany et al. | |
| 5,943,160 A | 8/1999 | Downing | |
| 5,956,172 A | 9/1999 | Downing | |
| 5,957,560 A | 9/1999 | Do et al. | |
| 6,064,521 A | 5/2000 | Burke | |
| 6,128,131 A | 10/2000 | Tang | |
| 6,166,852 A | 12/2000 | Miro | |
| 6,221,112 B1 | 4/2001 | Snider | |
| 6,239,907 B1 | 5/2001 | Allen et al. | |
| 6,261,402 B1 | 7/2001 | Watanabe et al. | |
| 6,327,074 B1 | 12/2001 | Bass et al. | |
| 6,337,769 B1 | 1/2002 | Lee | |
| 6,381,068 B1 | 4/2002 | Harada et al. | |
| 6,439,888 B1 | 8/2002 | Boutoussov et al. | |
| 6,466,184 B1 | 10/2002 | Whitesell et al. | |
| 6,501,590 B2 | 12/2002 | Bass et al. | |
| 6,507,436 B2 | 1/2003 | Nishikawa et al. | |
| 6,654,161 B2 | 11/2003 | Bass et al. | |
| 6,666,561 B1 * | 12/2003 | Blakley | 359/877 |
| 6,769,773 B1 | 8/2004 | Wu | |
| 6,804,053 B2 | 10/2004 | Etori et al. | |
| 6,809,781 B2 | 10/2004 | Setlur et al. | |
| 6,844,950 B2 | 1/2005 | Ja Chisholm et al. | |
| 6,870,671 B2 | 3/2005 | Travis | |
| 6,897,999 B1 | 5/2005 | Bass et al. | |
| 6,900,916 B2 * | 5/2005 | Okazaki et al. | 359/202 |
| 7,040,764 B2 * | 5/2006 | Przybyla et al. | 353/84 |
| 2001/0005282 A1 | 6/2001 | Etori et al. | |
| 2001/0019240 A1 * | 9/2001 | Takahashi | 313/483 |
| 2002/0024495 A1 | 2/2002 | Lippert et al. | |
| 2002/0048058 A1 | 4/2002 | Nishikawa et al. | |
| 2002/0080482 A1 | 6/2002 | Watanabe et al. | |
| 2002/0088925 A1 | 7/2002 | Nestorovic et al. | |
| 2002/0120916 A1 | 8/2002 | Snider | |
| 2002/0140338 A1 | 10/2002 | Sluzky | |
| 2002/0190224 A1 | 12/2002 | Tazaki | |
| 2003/0002153 A1 | 1/2003 | Hiraishi et al. | |
| 2003/0007132 A1 * | 1/2003 | Shouji | 353/30 |
| 2003/0198456 A1 | 10/2003 | Steiner et al. | |
| 2003/0213967 A1 | 11/2003 | Forrest et al. | |
| 2003/0214724 A1 | 11/2003 | Fujikawa et al. | |
| 2003/0227004 A1 | 12/2003 | Dopps | |
| 2004/0022071 A1 | 2/2004 | Cheng et al. | |
| 2004/0041988 A1 | 3/2004 | Kitamura | |
| 2004/0070551 A1 | 4/2004 | Walck et al. | |
| 2004/0070824 A1 | 4/2004 | Toda et al. | |
| 2004/0090794 A1 | 5/2004 | Ollett et al. | |
| 2004/0100692 A1 | 5/2004 | Hou | |
| 2004/0114219 A1 * | 6/2004 | Richardson | 359/368 |
| 2004/0135976 A1 | 7/2004 | Ishihara et al. | |
| 2004/0149998 A1 | 8/2004 | Henson et al. | |
| 2004/0164669 A1 | 8/2004 | Kawaguchi et al. | |
| 2004/0224154 A1 | 11/2004 | Toda et al. | |
| 2004/0233526 A1 | 11/2004 | Kaminsky et al. | |
| 2004/0257650 A1 | 12/2004 | Parusel et al. | |
| 2005/0030617 A1 | 2/2005 | Umeya | |
| 2005/0063054 A1 | 3/2005 | Umeya | |
| 2005/0088736 A1 | 4/2005 | Ghozeil et al. | |
| 2005/0088737 A1 | 4/2005 | Piehl | |
| 2005/0152032 A1 | 7/2005 | Olofson et al. | |
| 2005/0174635 A1 | 8/2005 | Bruegl et al. | |
| 2005/0254018 A1 * | 11/2005 | Magarill et al. | 353/94 |
| 2006/0203209 A1 * | 9/2006 | De Vaan | 353/84 |

FOREIGN PATENT DOCUMENTS

| | | |
|---|---|---|
| JP | 4281422 | 10/1992 |

OTHER PUBLICATIONS

E-Window Product Web Page. www.nano-proprietary.com.
Rockwell Collins Product Web Page. www.rockwellcollins.com.
Steigerwald et al., "Illumination With Solid State Lighting Technology", IEEE Journal on Selected Topics in Quantum Electronics, Mar. 2002, vol. 8, No. 2.
Jeon et al. "A novel famrication method for a 64×64 matrix-addressable GaN-based micro-LED array", Phys. Stat. Sol. (a) 200, No. 1, pp. 79-82 (2003).
Hawkyard, "The release of disperse dyes during thermal processing" Journal of the society of dyes and colourists, vol. 97 (1981) 213-219.
ProScreenInc Product Web Page. www.proscreeninc.com.
Web Page from www.smartmotorist.com.
Iwaya, et al., "High Power UV-Light-Emitting Diode on Sapphire", Jpn. J. Appl. Phys. vol. 42(2003) pp. 400-403.
Coosemans et al., "MT-compatible . . . datalinks", Materials Science In Semiconductor Processing, vol. 3 (2000) pp. 475-480.
"Handbook of Plastics, Elastomers, and Composites" Harper, C. McGraw-Hill, 3rd Ed (1996).
Xiao-Dong (Ted) Sun, etc. Identification and optimization of advanced phosphors using combinatorial libraries Appl. Phys. Lett., vol. 70, No. 25, Jun. 23, 1997.
"A Three- Color, Solid- State, Three Dimensional Display", E. Downing et al, Science vol. 273, pp. 1185-1189, 1996.
J. Lewis et al., IEEE Trans Election Devices vol. 18 pp. 724, 1971.

* cited by examiner

EXCITATION LIGHT EMISSION APPARATUS

Priority is claimed to U.S. Provisional Patent Application No. 60/563,376 (filed in the U.S. Patent and Trademark Office on Apr. 19, 2004), U.S. Provisional Patent Application No. 60/579,067 (filed in the U.S. Patent and Trademark Office on Jun. 10, 2004), U.S. Provisional Patent Application No. 60/586,746 (filed in the U.S. Patent and Trademark Office on Jul. 10, 2004), U.S. Provisional Patent Application No. 60/590,469 (filed in the U.S. Patent and Trademark Office on Jul. 24, 2004), U.S. Provisional Patent Application No. 60/598,527 (filed in the U.S. Patent and Trademark Office on Aug. 3, 2004), U.S. Provisional Patent Application No. 60/599,826 (filed in the U.S. Patent and Trademark Office on Aug. 7, 2004), U.S. Provisional Patent Application No. 60/626,152 (filed in the U.S. Patent and Trademark Office on Nov. 8, 2004), U.S. Provisional Patent Application No. 60/645,245 (filed in the U.S. Patent and Trademark Office on Jan. 20, 2005), U.S. Provisional Patent Application No. 60/658,242 (filed in the U.S. Patent and Trademark Office on Mar. 3, 2005), which are all herein incorporated by reference in entirety.

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays which create viewable images in glass. However, there have been many technical challenges that have prevented creation of viewable images in glass or other transparent material. Specifically, it has been difficult for glass to be maintained in a substantially transparent state and be able to display viewable images with sufficient illumination and clarity.

SUMMARY

In accordance with embodiments, viewable images can be created in glass. Viewable images may be created in glass by using at least one ultraviolet light source (e.g. a projector) to excite light emitting material. Clear images may be created in glass because the size the light emitting particles in the glass is relatively small (e.g. less than 500 nanometers). In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching, while the windows remain transparent. In embodiments, different colors may be illuminated on glass by adjusting the wavelength of the ultraviolet light to create color images.

Embodiments relate to an apparatus including a light source, a projection modulator, and a variable light filter. The projection modulator is configured modulate light emitted from the light source. The variable light filter is configured to selectively transmit at least two different wavelength ranges of light. The at least two different wavelength ranges of light include light with a wavelength less than 500 nanometers.

Embodiments relate to a method including emitting light from a light source, modulating the light at a projection modulator, and filtering the light at a variable light filter. The variable light filter is configured to selectively transmit at least two different wavelength ranges of light. The at least two different wavelength ranges of light include light with a wavelength less than 500 nanometers.

Embodiments relate to a method including integrating a light source, a projection modulator, and a variable light filter into a projector. The projection modulator is configured modulate light emitted from the light source. The variable light filter is configured to selectively transmit at least two different wavelength ranges of light. The at least two different wavelength ranges of light comprise light with a wavelength less than 500 nanometers.

DRAWINGS

DESCRIPTION

Figure 1:
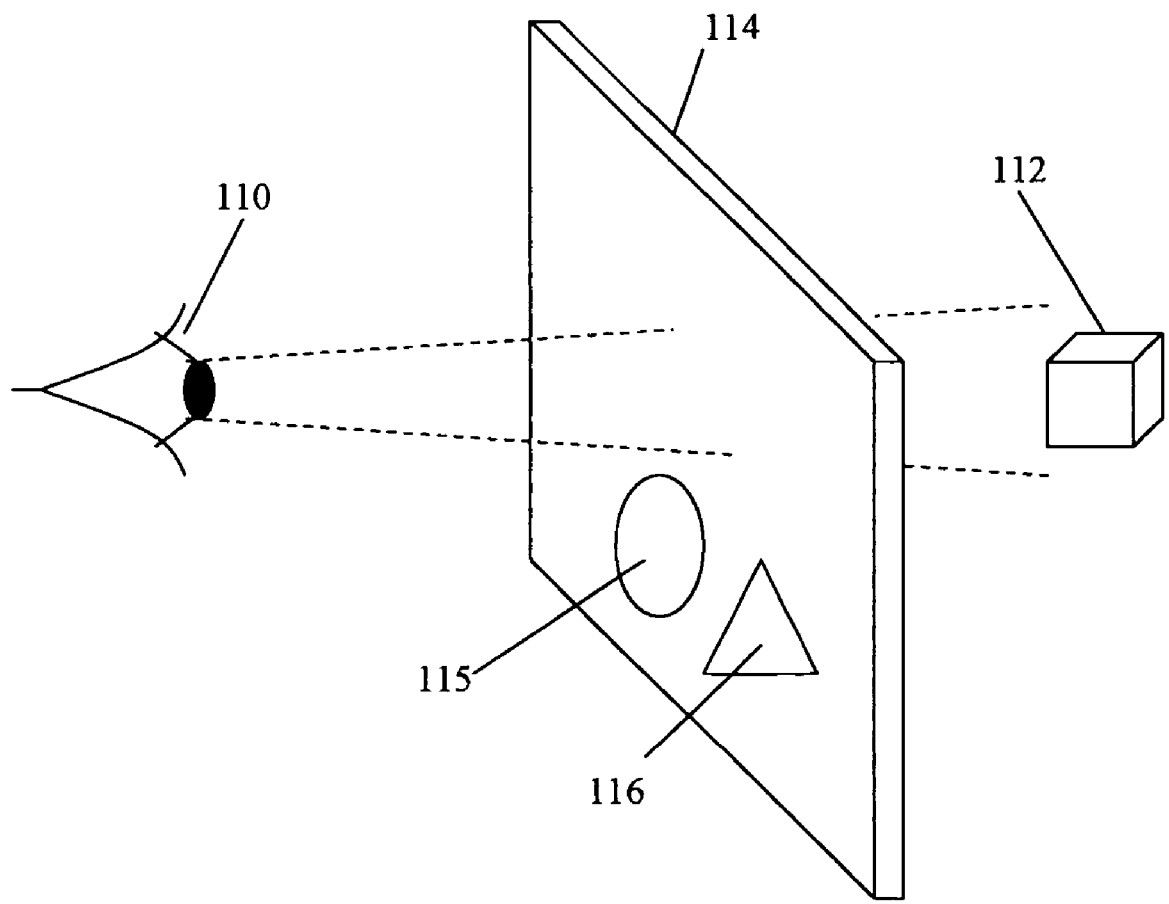
FIG. 1 is an example diagram of a substantially transparent display.

FIG. 1 is an example diagram of a substantially transparent display, in accordance with embodiments. Viewer 110 is able to see an arbitrary object (e.g. cube 112) through substrate 114. Substrate 114 may be transparent or substantially transparent. While viewer 110 sees arbitrary object 112 through substrate 114, the viewer can also see images (e.g. circle 115 and triangle 116) that are created at substrate 114. Substrate 114 may be part of a vehicle windshield, a building window, a glass substrate, a plastic substrate, a polymer substrate, or other transparent (or substantially transparent) medium that would be appreciated by one of ordinary skill in the art. Other substrates may complement substrate 114 to provide for tinting, substrate protection, light filtering (e.g. filtering external ultraviolet light), and other functions.

Figure 2:
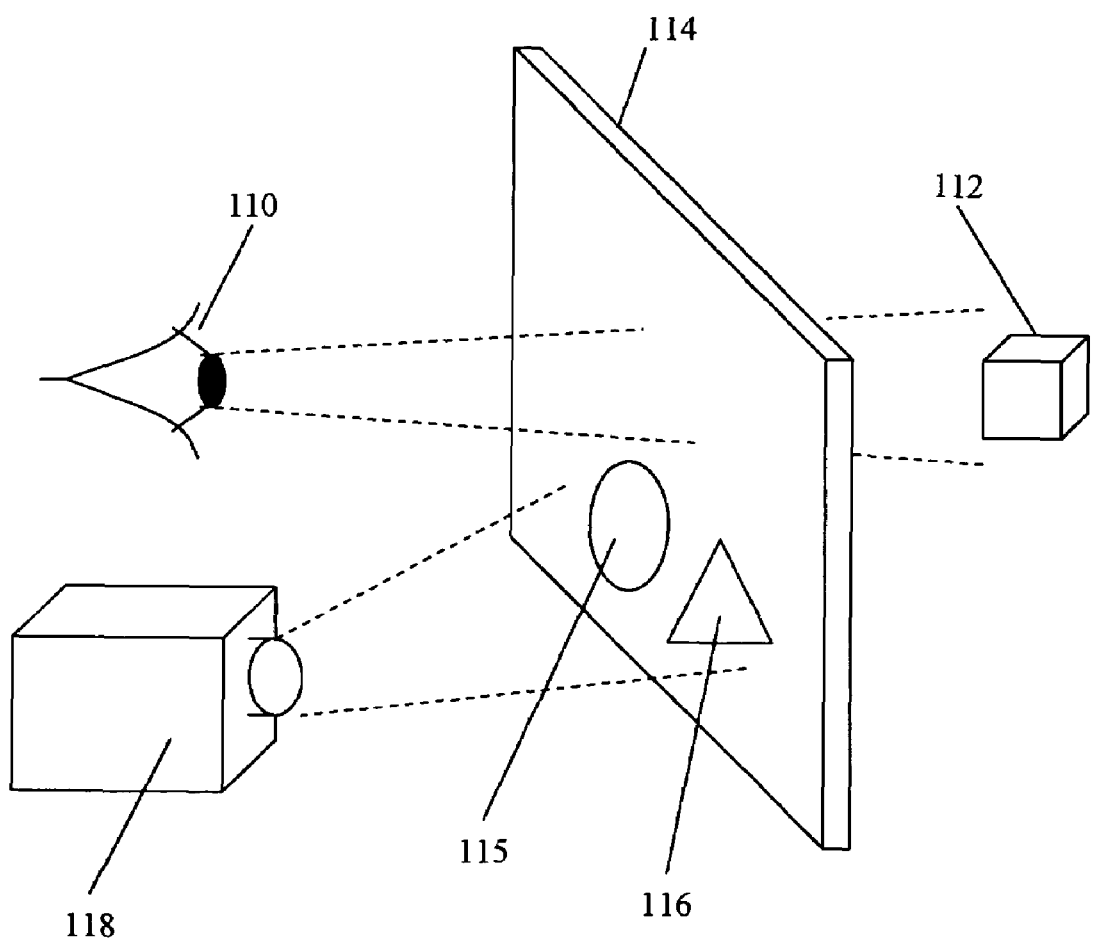
FIG. 2 is an example diagram of a transparent display illuminated with excitation light from a projector.

FIG. 2 is an example diagram of a transparent display illuminated with excitation light (e.g. ultraviolet light) from a projector 118, in accordance with embodiments. Substrate 114 may receive excitation light from projector 118. The received excitation light may be absorbed by light emitting material at substrate 114. When the light emitting material receives the excitation light, the light emitting material may emit visible light. Accordingly, images (e.g. circle 115 and triangle 116) may be created at substrate 114 by selectively illuminating substrate 114 with excitation light.

The excitation light may be ultraviolet light, in accordance with embodiments. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light; In embodiments, the light emitting material is fluorescent material.

In embodiments illustrated in FIG. 2, the excitation light is output by projector 118. Projector 118 maybe a digital projector. In embodiments projector 118 is a micro mirror projector (e.g. a digital light processing (DLP) projector). Projector 118 may include a micro-mirror array (MMA). In embodiments, projector 118 includes a digital micromirror device (DMD). In other embodiments, projector 118 includes an analog micromirror device. Projector 118 includes a variable light filter which is tailored to the ultraviolet light spectrum. In embodiments, the variable light filter is a color wheel with at least two light filters that let different ranges of ultraviolet light pass.

Figure 3:
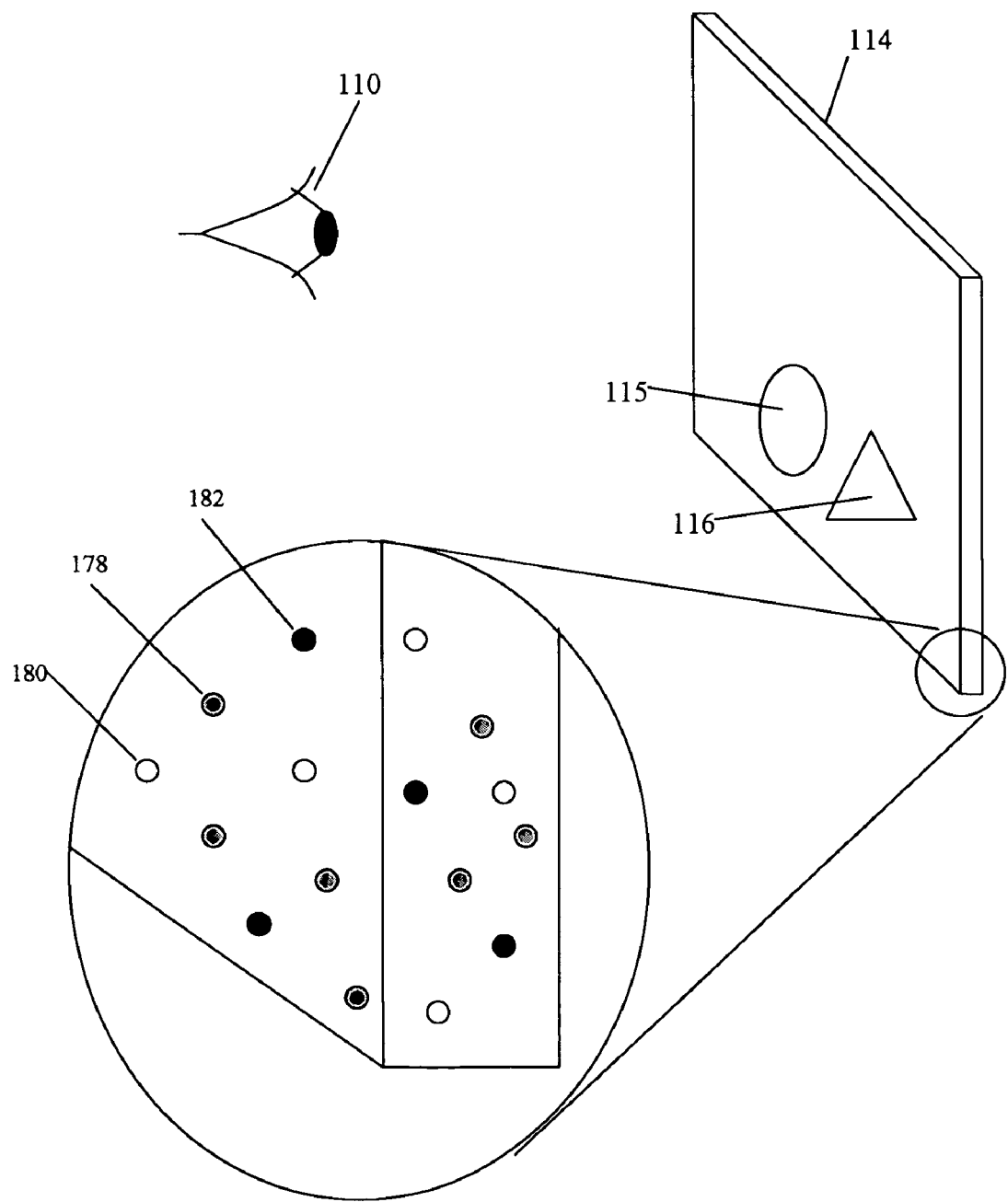
FIG. 3 is an example diagram of light emitting particles integrated into a substantially transparent substrate.

FIG. 3 is an example diagram of light emitting material (e.g. light emitting materials 178, 180, and/or 182) integrated into a substantially transparent substrate, according to embodiments. When excitation light is absorbed by the light emitting materials 178, 180, and/or 182, the light emitting materials emit visible light. Accordingly, when ultraviolet light is absorbed by light emitting materials 178, 180, and/or 182, visible light is emitted from the light emitting materials. In embodiments, each of light emitting materials 178, 180, and/or 182 may be a different type of light emitting material, which emits a different range of wavelengths of visible light in response to a different range of wavelengths of excitation light (e.g. ultraviolet). The different ranges of wavelengths of excitation light may be controlled by a variable light filter. Light emitting material can be integrated in a substantially transparent substrate in a variety of ways. As examples, light emitting materials can be dispersed in a substrate (as shown in example FIG. 3), layered on a substrate, and disposed on a surface of a substrate.

Light emitting material (e.g. light emitting materials 178, 180, and/or 182) may be fluorescent material, which emits visible light in response to absorption of electromagnetic radiation (e.g. visible light, ultraviolet light, or infrared light) that is a different wavelength than the emitted visible light. Light emitting material may include light emitting particles. The size of the particles may be smaller than the wavelength of visible light, which may reduce or eliminate visible light scattering by the particles. Examples of particles that are smaller than the wavelength of visible light are nanoparticles, individual molecules, and individual atoms.

According to embodiments, each of the light emitting particles has a diameter that is less than about 500 nanometers. According to embodiments, each of the light emitting particles has a diameter that is less than about 450 nanometers. According to embodiments, each of the light emitting particles has a diameter that is less than about 420 nanometers. According to embodiments, each of the light emitting particles has a diameter that is less than about 400 nanometers. According to embodiments, each of the light emitting particles has a diameter that is less than about 300 nanometer. According to embodiments, each of the light emitting particles has a diameter that is less than about 200 nanometers. According to embodiments, each of the light emitting particles has a diameter that is less than about 100 nanometers. According to embodiments, each of the light emitting particles has a diameter that is less than about 50 nanometers. The light emitting particles may be individual molecules or individual atoms.

Different types of light emitting particles (e.g. light emitting materials 178, 180, and/or 182) may be used together that have different physical characteristics. For example, in order to create color images in substrate 114, different types of light emitting particles may be utilized that are associated with different colors. For example, a first type of light emitting particles may be associated with the color red, a second type of light emitting particles may be associated with the color green, and a third type of light emitting particles may be associated with the color blue. Although the example first type, second type, and third type of light emitting particles are primary colors, one of ordinary skill in the art would appreciate other combinations of colors (e.g. types of colors and number of colors) in order to facilitate a color display.

In down-conversion embodiments (e.g. absorption of ultraviolet light to emit visible light), light emitting particles which emit red light may include Europium, light emitting particles which emit green light may include Terbium, and/or light emitting particles which emit blue or yellow light may include Cerium (and/or Thulium). In embodiments, light emitting particles which emit blue light may include Erbium. In embodiments, light emitting materials which emit blue light may include an organic fluorescent dye.

Different types of light emitting particles may absorb different ranges of excitation light to emit the different colors. Accordingly, the wavelength range of the excitation light may be modulated to control the visible color emitted from the light emitting particles in substrate 114. In embodiments, different types of light emitting particles may be mixed together and integrated into substrate 114. By modulating the wavelength of the excitation light, visible light with specific color characteristics can be created in substrate 114. For example, by selectively exciting specific combinations of different types of light emitting particles associated with primary colors, virtually any visible color can be emitted from substrate 114. In embodiments, modulating of the excitation light wavelength can utilize a variable light filter. In embodiments, the variable light filter is a color wheel with specific ultraviolet pass filters.

Figure 4:
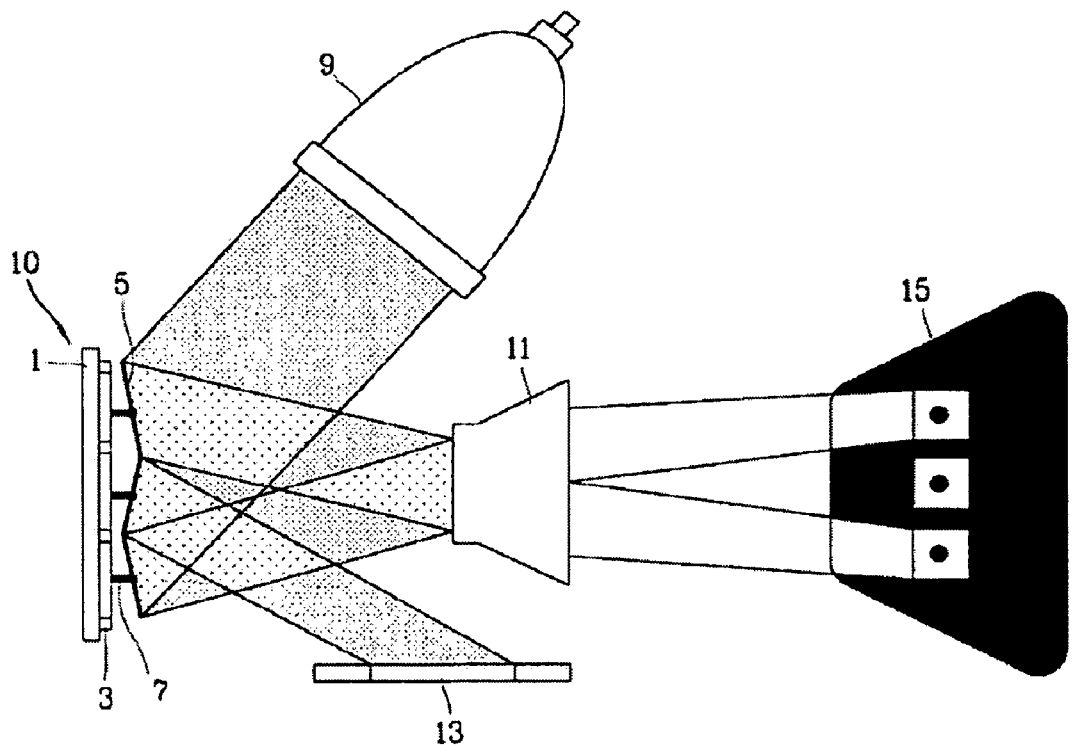
FIG. 4 is an example diagram of a micro mirror device, illustrating general operation characteristics when used in a projector.

FIG. 4 is an example diagram illustrating operation of a projector which uses micro mirror device 10, in accordance with embodiments. However, other implementations and configurations of a projector can be appreciated, in accordance with embodiments. The projector may include light source 9 (e.g. a lamp), micro mirror device 10, projection lens 11, and absorption plate 13. Micro mirror device 10 may receive light output from light source 9 and may reflect the incident light at an angle in accordance with a control signal input to micro mirror device 10. Projection lens 11 may focus light reflected from micro mirror device 10 onto screen 15 when a corresponding mirror is at a first angle. Absorption plate 13 may absorb light reflected off of micro mirror device 10 when a corresponding mirror is at a second angle. Accordingly, light can be either projected onto screen 15 or absorbed at absorption plate 13, depending on an angle of each respective mirror of micro mirror device 10. Micro mirror device 10 may include an array of micro mirrors which can be selectively controlled to form images on screen 15.

In embodiments, light source 9 may output ultraviolet light. Light source 9 may be a gas discharge lamp, a solid state lamp, a light emitting diode lamp, and/or a metal halide lamp. Other types of lamps that can output ultraviolet light can be appreciated. Light source 9 may include a reflector. In embodiments, the reflector has a reflective enhancement coating. In embodiments, the reflective enhancement coating reflects light having a wavelength less than 500 nanometer. In embodiments, the reflective enhancement coating reflects light having a wavelength less than 450 nanometer. In embodiments, the reflective enhancement coating reflects light having a wavelength less than 420 nanometer. In embodiments, the reflective enhancement coating reflects ultraviolet light.

Micro mirror device 10 may include blackboard 1, a plurality of electrodes 3, micro mirrors 5, and support 7. Plurality of electrodes 3 may be coupled to the blackboard 1. Micro mirrors 5 may receive light output from light source 9 and selectively reflect the light at different angles to form images on screen 15. Support 7 mechanically supports micro mirrors 5.

Plurality of electrodes 3 may generate an electrostatic field by an input voltage signal to modulate movements of supporting member 7. Micro mirrors 5 (which may be relatively small) may be attached to supporting member 7 and rotated at a relatively small angle. Light is reflected from light source 9 to either projection lens 11 or absorption plate 13, depending on the angle of micro mirror 5. Projection lens 11 may receive light reflected from micro mirror device 10 and project the light to the screen 15 to display an image.

Micro mirrors 5 may be slanted at an initial angle. When light output from light source 9 is projected onto micro mirrors 5, micro mirrors 5 reflect the light to absorption plate 13. Accordingly, under these circumstances, since micro mirrors 5 do not reflect light to projection lens 11, a blank image (e.g. black image) appears on screen 15.

When a signal is input to plurality of electrodes 3 on blackboard 1, plurality of electrodes 3 may generate an electrostatic field which selectively causes supporting member 7 to rotate within a sufficient angle range. When micro mirrors 5 are rotated at an appropriate angle, light incident on micro mirrors 5 is reflected to projection lens 11, which projects the light onto screen 15, causing selective illumination of pixels (associated with rotated micro mirrors 5). Micro mirrors 5 may be selectively rotated at high speeds (e.g. on/off operations) to produce a moving (or static) image on screen 15.

Figure 5:
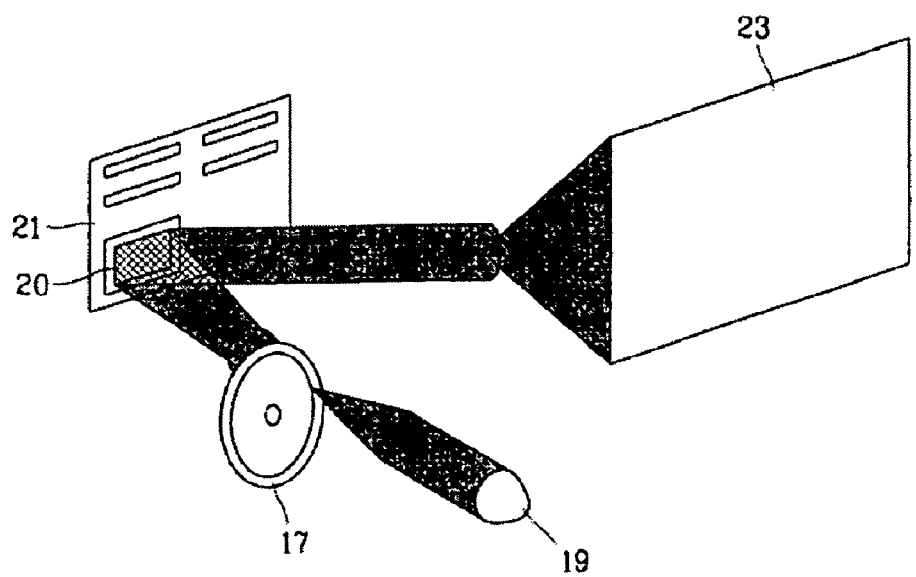
FIG. 5 is an example diagram illustrating direct reflection operation of a micro mirror device.

FIG. 5 is an example illustration of a projector operating with direct reflection off of micro mirror device 20, in accordance with embodiments. A projector may include light source 19, filter wheel 17, and micro mirror device 20. Micro mirror device 20 may be in the form of a chip and may be attached to board 21. Filter wheel 17 (an example of a variable filter) may be for varying the wavelength of the light output from light source 19 into different spectrums of ultraviolet light. For example rotation of filter wheel 17 may vary the wavelength of light that is allowed to pass through filter wheel 17. Micro mirror device 20 may receive light output from filter wheel 17 and reflect the light onto screen 23. The selective reflection of light from micro mirror device 20 and the position in rotation of filter wheel 17 may be calibrated so that images with predetermined characteristics can be displayed.

Figure 6:
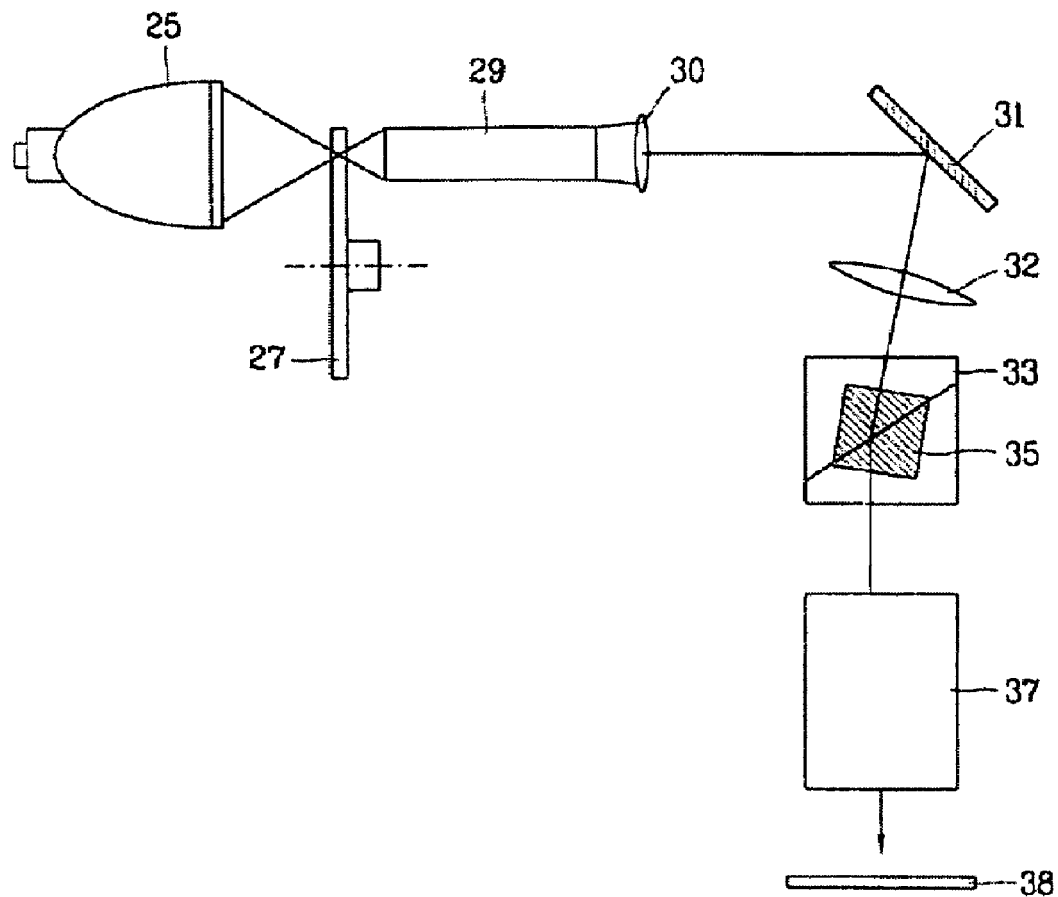
FIGS. 6 and 7 illustrate example relationships of components of a projector that includes a micro mirror device.
Figure 7:
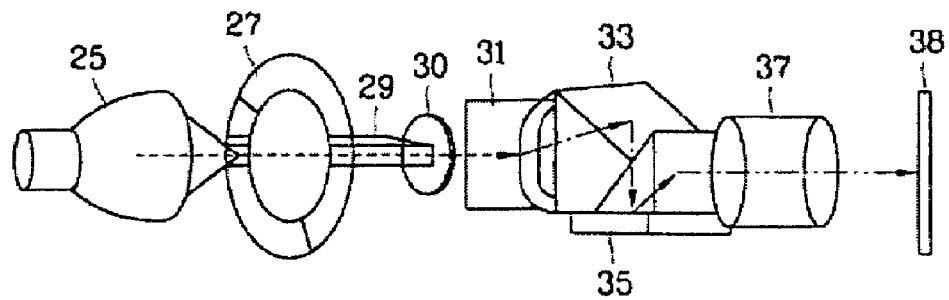

FIG. 6 is an example illustration of projector components which includes a prism, in accordance with embodiments. FIG. 7 is a different view of the projector components illustrated in FIG. 6. A projector may include light source 25, filter wheel 27, light pipe 29, lens 30, mirror 31, lens 32, prism 33, micro mirror device 35, and/or lens 37, which may be configured to manipulate ultraviolet light.

Filter wheel 27 may be for varying the wavelength of the light output from light source 25 in the ultraviolet spectrum. Filter wheel 27 may rotate to vary the wavelength of light that is allowed to pass through filter wheel 27. Micro mirror device 35 may receive light output from filter wheel 27 and reflect the light onto screen 38. The selective reflection of light from micro mirror device 35 and the position in rotation of filter wheel 27 may be calibrated so that images with predetermined characteristics can be displayed. Light pipe 29 may receive light from filter wheel 27 and spatially redistribute the light at a substantially uniform intensity. In embodiments, light pipe 29 is designed to reflect ultraviolet light, so that incident ultraviolet light is spatially redistributed at a substantially uniform intensity. Lens 30 may be for focusing light output from light pipe 29 to reduce the diameter of the light. In embodiments, lens 30 is configured to collect ultraviolet light. Mirror 31 may be for reflecting light output from lens 30 at an angle. Lens 32 may be for focusing light output from mirror 31. In embodiments, lens 30 and lens 32 are configured to focus ultraviolet light. Prism 33 may receive light output from lens 32 and transmit the light in a direction according to angles of mirrors of micro mirror device 35, in accordance with control signals input into micro mirror device 35. In embodiments, prism 33 is configured to transmit ultraviolet light.

In FIG. 4 through 7, micro mirror device 13, micro mirror device 20, and micro mirror device 35 are examples of projection modulators. However, other types of projection modulators can be appreciated. Arrangement, inclusion, and/or exclusion of components which have functional relationships with a projection modulator can be appreciated. In embodiments, a projection modulator can be configured to modulate ultraviolet light.

In FIGS. 4 through 7, filter wheel 17 and filter wheel 27 are examples of variable light filters. However, other types of variable light filters can be appreciated. Arrangement, inclusion, and/or exclusion of components which have functional relationships with a variable light filter can be appreciated. In embodiments, a variable light filter can be configured to pass different spectrums of ultraviolet light.

In FIGS. 6 and 7, light pipe 29 is an example of a light integrator. However, other types of light integrators can be appreciated. Arrangement, inclusion, and/or exclusion of components which have functional relationships with a light integrator can be appreciated. In embodiments, a light integrator can be configured to spatially redistribute ultraviolet light substantially uniformly. In embodiments, a light integrator may include an ultraviolet transparent material (e.g. material which transmits light having a wavelength less than 500 nanometers). Example ultraviolet transparent materials are fused silica, calcium fluoride, magnesium fluoride, sapphire, barium fluoride, beryllium oxide, calcite, and/or germanium oxide.

Figure 8:
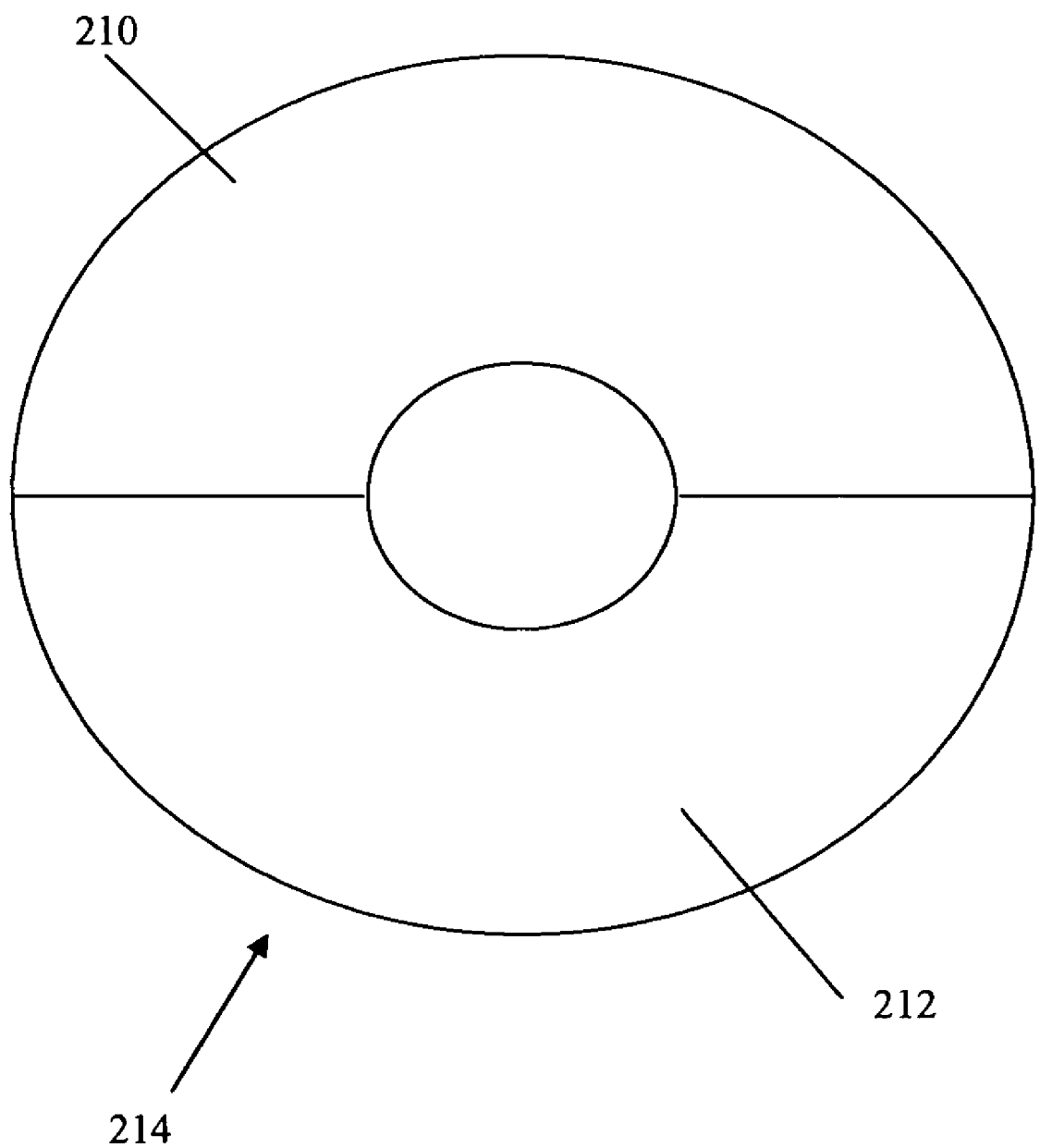
FIGS. 8 through 11 illustrate examples of different variable light filters.

FIGS. 8 through 11 illustrate examples of different variable filters. FIG. 8 illustrates variable light filter 214 with a first region 210 and a second region 212. Variable light filter 214 may be a filter wheel. First region 210 and second region 212 may be filters that pass different ranges of excitation light.

Figure 9:
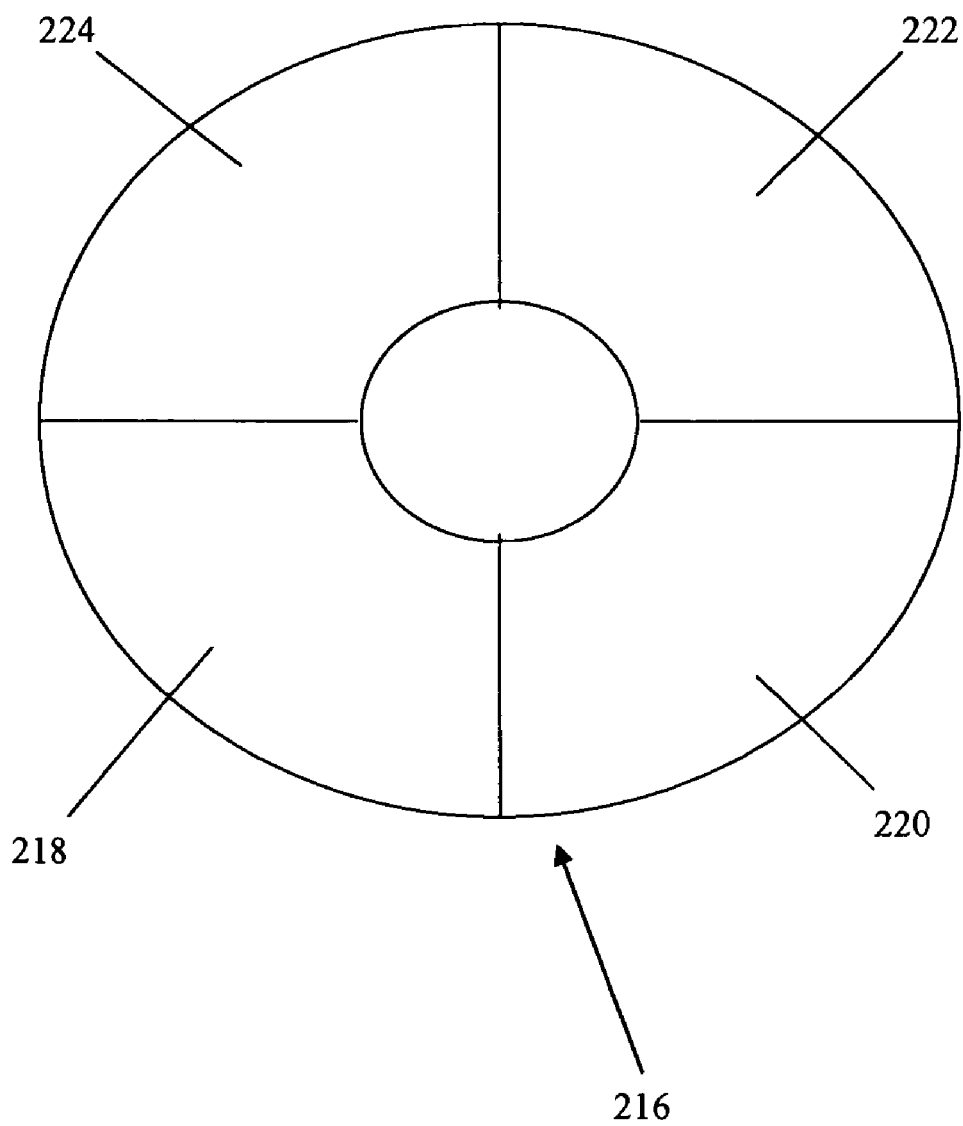

FIG. 9 illustrates variable light filter 216 with four regions (regions 224, 222, 218, and 220). Any number of regions could be implemented in accordance with embodiments.

Figure 10:
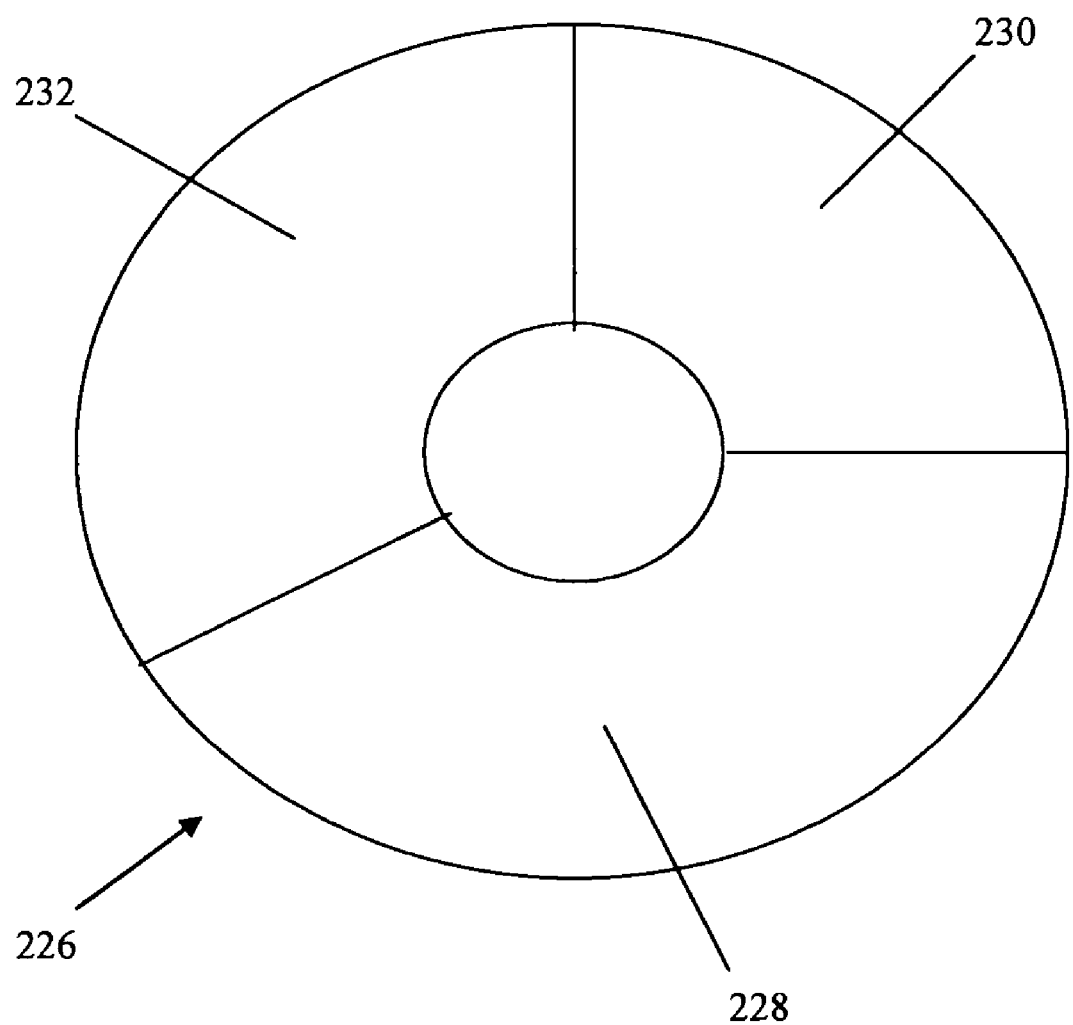

FIG. 10 illustrates variable light filter 226 with three regions (regions 232, 230, and 228). As illustrated in FIG. 10, the different regions can be distributed non-uniformly. As illustrated in FIGS. 8 and 9, the different regions can be distributed uniformly. Regions may be distributed non-uniformly to compensate differences in visible light emission of light emitting materials.

Figure 11:
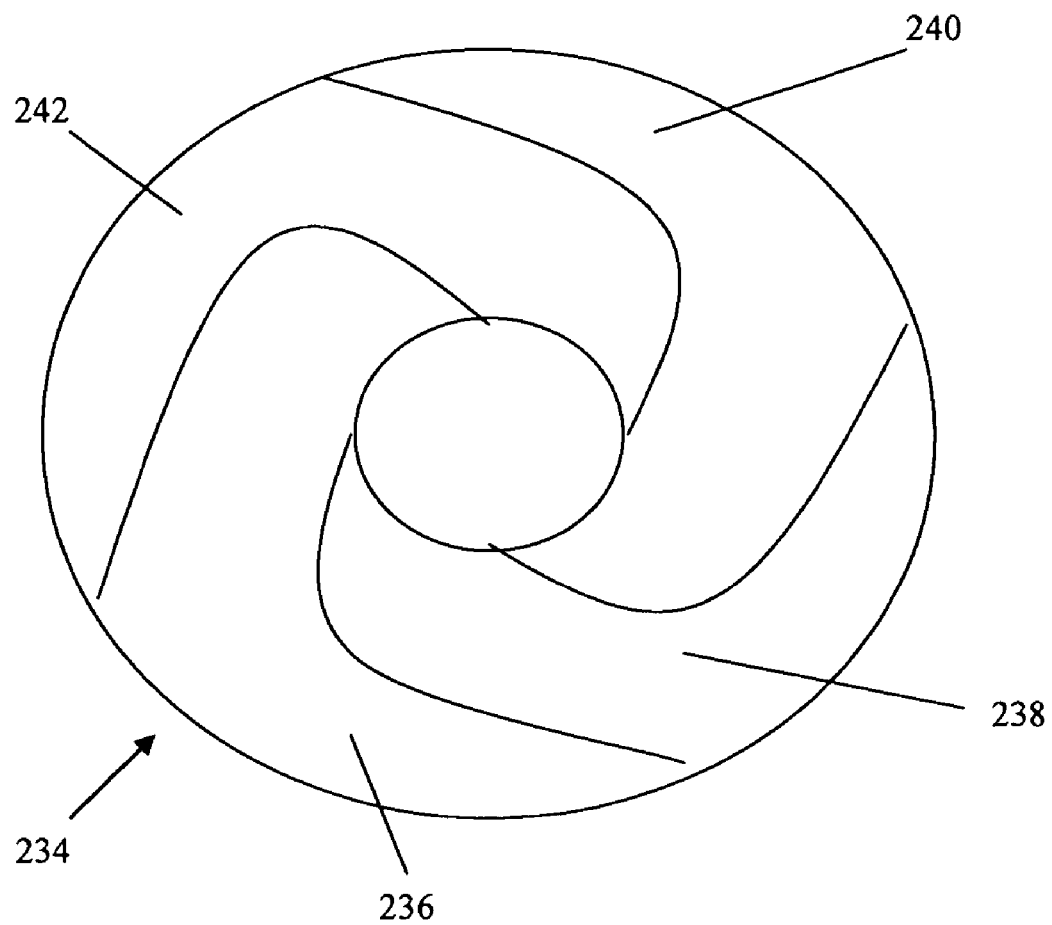

FIG. 11 illustrates variable light filter 234 with four regions (regions 242, 240, 238, and 236) distributed in a spiral pattern. A variable light filter with a spiral pattern may increase efficiency of a projector by reusing back reflected light. As illustrated in FIGS. 8 through 10, regions of a variable light filter may be distributed in a radial direction. Other distributions of light filter regions can be appreciated.

Embodiments relate to an apparatus including a light source, a projection modulator, and a variable light filter. The projection modulator is configured to modulate light emitted from the light source. The variable light filter is configured to selectively transmit at least two different wavelength ranges of light. The at least two different wavelength ranges of light include light with a wavelength less than 500 nanometers. The at least two different wavelength ranges of light may include light with a wavelength less than 450 nanometers. The at least two different wavelength ranges of light may include light with a wavelength less than 420 nanometers. The light transmitted through the light source may be projected onto a substantially transparent substrate. Fluorescent particles may be integrated into the substantially transparent substrate. Fluorescent particles may emit visible light in response to absorption of light emitted from the light source. Each of the fluorescent particles may have a diameter less than 500 nanometers. The at least two different wavelength ranges of light may include ultraviolet light. The at least two different wavelength ranges of light may consist of ultraviolet light. The projection modulator may include an array of modulators. Each modulator of the array of modulators may be a movable mirror. The projection modulator may be a micro mirror device. The micro mirror device may be an analog micro mirror device. The micro mirror device may be a digital micro mirror device. The micro mirror device may be configured to modulate light having a wavelength less than 500 nanometers. The variable light filter may be configured to transmit light prior to the light being modulated by the projection modulator. The variable light filter may include a disk with at least two different types of light filters. The variable light filter may be configured to selectively transmit the at two different wavelength ranges of light by selectively rotating the disk to control which of the at least two different types of light filters is in a path of light emitted from the light source. The at least two different types of light filters may be substantially evenly distributed on the disk. The at least two different types of light filters may be non-uniformly distributed on the disk. The at least two different types of light filters may be distributed on the disk in a radial direction. The at least two different types of light filters may be distributed on the disk in a spiral pattern. At least one lens may be configured to focus light having a wavelength less than 500 nanometers. A light integrator may be configured to redistribute light having a wavelength less than 500 nanometers. The light integrator may include an ultraviolet transparent material and an anti-reflective coating for light having a wavelength less than 500 nanometers. The ultraviolet transparent material may include fused silica, calcium fluoride, magnesium fluoride, sapphire, barium fluoride, beryllium oxide, calcite, and/or germanium oxide. The light source may include a reflector. The reflector may have a reflective enhancement coating for light having a wavelength less than 500 nanometers. The light source may include an ultraviolet lamp. The ultraviolet lamp may be one of a gas discharge lamp, a solid state lamp, a light emitting diode lamp, and a metal halide lamp. A visible light filter may be configured to substantially remove visible light emitted from the light source prior to light from the light source being modulated by the projection modulator. A light separator may be configured to separate light having a wavelength less than 500 nanometers.

Embodiments relate to a method including emitting light from a light source, modulating the light at a projection modulator, and filtering the light at a variable light filter. The variable light filter is configured to selectively transmit at least two different wavelength ranges of light. The at least two different wavelength ranges of light include light with a wavelength less than 500 nanometers.

Embodiments relate to a method including integrating a light source, a projection modulator, and a variable light filter into a projector. The projection modulator is configured modulate light emitted from the light source. The variable light filter is configured to selectively transmit at least two different wavelength ranges of light. The at least two different wavelength ranges of light comprise light with a wavelength less than 500 nanometers.

The foregoing embodiments (e.g. light emitting material integrated into a substantially transparent substrate) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising:
   a light source;
   a projection modulator, wherein:
      the projection modulator is configured to modulate light emitted from the light source; and
      the projection modulator is configured to modulate light having a wavelength less than 500 nanometers; and
   a variable light filter, wherein:
      the variable light filter is configured to selectively transmit at least two different wavelength ranges of light, and
   the at least two different wavelength ranges of light comprise light with a wavelength less than 500 nanometers.

2. The apparatus of claim 1, wherein the at least two different wavelength ranges of light comprise light with a wavelength less than 450 nanometers.

3. The apparatus of claim 2, wherein the at least two different wavelength ranges of light comprise light with a wavelength less than 420 nanometers.

4. The apparatus of claim 1, wherein:
   the light transmitted through the light source is projected onto a substantially transparent substrate;
   fluorescent particles are integrated into the substantially transparent substrate;
   the fluorescent particles emit visible light in response to absorption of light emitted from the light source; and
   each of the fluorescent particles have a diameter less than 500 nanometers.

5. The apparatus of claim 1, wherein the at least two different wavelength ranges of light comprises ultraviolet light.

6. The apparatus of claim 5, wherein the at least two different wavelength ranges of light consist of ultraviolet light.

7. The apparatus of claim 1, wherein the projection modulator comprises an array of modulators.

8. The apparatus of claim 7, wherein each modulator of the array of modulators is a movable mirror.

9. The apparatus of claim 8, wherein the projection modulator is a micro mirror device.

10. The apparatus of claim 9, wherein the micro mirror device is an analog micro mirror device.

11. The apparatus of claim 9, wherein the micro mirror device is a digital micro mirror device.

12. The apparatus of claim 1, wherein the variable light filter is configured to transmit light prior to the light being modulated by the projection modulator.

13. The apparatus of claim 1, wherein the variable light filter comprises a disk with at least two different types of light filters.

14. The apparatus of claim 13, wherein the variable light filter is configured to selectively transmit the at two different wavelength ranges of light by selectively rotating the disk to control which of the at least two different types of light filters is in a path of light emitted from the light source.

15. The apparatus of claim 13, wherein the at least two different types of light filters are substantially evenly distributed on the disk.

16. The apparatus of claim 13, wherein the at least two different types of light filters are non-uniformly distributed on the disk.

17. The apparatus of claim 13, wherein the at least two different types of light filters are distributed on the disk in a radial direction.

18. The apparatus of claim 13, wherein the at least two different types of light filters are distributed on the disk in a spiral pattern.

19. The apparatus of claim 1 comprising at least one lens configured to focus light having a wavelength less than 500 nanometers.

20. The apparatus of claim 1 comprising a light integrator, wherein:
   the light integrator is configured to redistribute light having a wavelength less than 500 nanometers; and
   the light integrator comprises an ultraviolet transparent material and an anti-reflective coating for light having a wavelength less than 500 nanometers.

21. The apparatus of claim 20, wherein the ultraviolet transparent material comprises at least one of:
   fused silica;
   calcium fluoride;
   magnesium fluoride;
   sapphire;
   barium fluoride;
   beryllium oxide;
   calcite; and
   germanium oxide.

22. The apparatus of claim 1, wherein:
   the light source comprises a reflector;
   the reflector has a reflective enhancement coating for light having a wavelength less than 500 nanometers.

23. The apparatus of claim 1, wherein the light source comprises an ultraviolet lamp.

24. The apparatus of claim 23, wherein the ultraviolet lamp is selected from a group consisting of:
   a gas discharge lamp;
   a solid state lamp;
   a light emitting diode lamp; and
   a metal halide lamp.

25. The apparatus of claim 1 comprising a visible light filter, wherein the visible light filter is configured to substantially remove visible light emitted from the light source prior to light from the light source being modulated by the projection modulator.

26. The apparatus of claim 1 comprising a light separator configured to separate light having a wavelength less than 500 nanometers.

27. A method comprising:
   emitting light from a light source;
   modulating the light having a wavelength less than 500 nanometers at a projection modulator; and
   filtering the light at a variable light filter, wherein:
      the variable light filter is configured to selectively transmit at least two different wavelength ranges of light, and
      the at least two different wavelength ranges of light comprise light with a wavelength less than 500 nanometers.

28. A method comprising integrating a light source, a projection modulator, and a variable light filter into a projector, wherein:
   the projection modulator is configured to modulate light having a wavelength less than 500 nanometers emitted from the light source; and
   the variable light filter is configured to selectively transmit at least two different wavelength ranges of light, and
   the at least two different wavelength ranges of light comprise light with a wavelength less than 500 nanometers.

* * * * *